United States Patent
Miller et al.

(10) Patent No.: US 8,901,429 B2
(45) Date of Patent: Dec. 2, 2014

(54) DIMENSIONALLY ADJUSTABLE COVER FOR CONDUCTORS AND INSULATORS

(71) Applicant: Preformed Line Products, Mayfield Village, OH (US)

(72) Inventors: Keith Miller, Twinsburg, OH (US); Mark Burns, Macedonia, OH (US); Robert Peterson, Chardon, OH (US); Tom Haic, Concord, OH (US); Randy Cloud, Mentor, OH (US)

(73) Assignee: Preformed Line Products Co., Mayfield Village, OH (US)

( * ) Notice: Subject to any disclaimer, the term of this patent is extended or adjusted under 35 U.S.C. 154(b) by 117 days.

(21) Appl. No.: 13/843,257

(22) Filed: Mar. 15, 2013

(65) Prior Publication Data
US 2014/0262435 A1    Sep. 18, 2014

(51) Int. Cl.
*H01R 4/70* (2006.01)
*H02G 1/00* (2006.01)
*H02G 11/00* (2006.01)

(52) U.S. Cl.
CPC . *H02G 11/00* (2013.01); *H02G 1/00* (2013.01)
USPC ................ 174/138 F; 174/137 R; 174/138 G; 174/40 R; 174/138 B; 361/626; 248/49; 52/101

(58) Field of Classification Search
USPC ....... 174/137 R, 138 B, 138 R, 138 E, 138 G, 174/40 R, 163 R, 148; 361/626; 248/49, 248/74.4; 52/101
See application file for complete search history.

(56) References Cited

U.S. PATENT DOCUMENTS

| | | | | |
|---|---|---|---|---|
| 5,446,242 A | * | 8/1995 | Barrett | 174/140 R |
| 6,730,852 B1 | * | 5/2004 | Puigcerver et al. | 174/138 F |
| 7,884,285 B2 | * | 2/2011 | Spencer | 174/138 F |

\* cited by examiner

*Primary Examiner* — Dhirubhai R Patel
(74) *Attorney, Agent, or Firm* — Cooper Legal Group, LLC

(57) ABSTRACT

A cover apparatus can cover an electrical insulator and an electrical conductor. The cover apparatus includes a leg section that covers a portion of the electrical conductor. A cover section covers a portion of the electrical insulator. The cover section can include a body portion that is coupled to the leg section at a first coupling location. The cover section includes an adjustable portion coupled to the body portion at a second coupling location located on an opposite side of the body portion relative to the first coupling location. The adjustable portion can be adjusted such that a dimension of the adjustable portion is adjusted according to a dimension of the electrical insulator. A method of forming a cover apparatus for covering an electrical insulator and an electrical conductor is also provided.

20 Claims, 7 Drawing Sheets

US 8,901,429 B2

DIMENSIONALLY ADJUSTABLE COVER FOR CONDUCTORS AND INSULATORS

TECHNICAL FIELD

The instant application is generally directed towards a cover apparatus. For example, the instant application is directed towards a cover apparatus for covering an electrical insulator and an electrical conductor.

BACKGROUND

Wildlife, including avian wildlife (e.g., birds, raptors, eagles, etc.) can perch or otherwise come into contact with electrical insulators and energized conductors, which can, among other things, compromise reliability and stability of a service offered by a utility and/or harm the wildlife.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a cover apparatus can cover an electrical insulator and an electrical conductor. The cover apparatus comprises a leg section configured to cover a portion of the electrical conductor. A cover section is configured to cover a portion of the electrical insulator. The cover section comprises a body portion that is coupled to the leg section at a first coupling location. An adjustable portion is coupled to the body portion at a second coupling location located on an opposite side of the body portion relative to the first coupling location. The adjustable portion can be adjusted such that a dimension of the adjustable portion is adjusted according to a dimension of the electrical insulator.

In an example, a cover apparatus can cover an electrical insulator and an electrical conductor. The cover apparatus comprises a leg section configured to cover a portion of the electrical conductor. A cover section is configured to cover a portion of the electrical insulator. The cover section comprises a body portion that is coupled to the leg section at a first coupling location. The body portion defines a first opening configured to accommodate a second portion of the electrical conductor. An adjustable portion is coupled to the body portion at a second coupling location located on an opposite side of the body portion relative to the first coupling location. The adjustable portion can be adjusted such that a dimension of the adjustable portion is adjusted according to a dimension of the electrical insulator. The adjustable portion defines a second opening configured to accommodate a second portion of the electrical insulator.

In an example, a method of forming a cover apparatus for covering an electrical insulator and an electrical conductor is provided. The method comprises providing a cover section of the cover apparatus and a leg section of the cover apparatus. The leg section is configured to cover a portion of the electrical conductor and the cover section is configured to cover a portion of the electrical insulator, the cover section comprising a body portion that is coupled to the leg section at a first coupling location and an adjustable portion coupled to the body portion at a second coupling location located on an opposite side of the body portion relative to the first coupling location, the adjustable portion configured to be adjusted such that a dimension of the adjustable portion is adjusted according to a dimension of the electrical insulator. The method comprises removing a portion of the adjustable portion to reduce a length of the adjustable portion according to the dimension of the electrical insulator.

The following description and annexed drawings set forth certain illustrative aspects and implementations. These are indicative of but a few of the various ways in which one or more aspects can be employed. Other aspects, advantages, and novel features of the disclosure will become apparent from the following detailed description when considered in conjunction with the annexed drawings.

DETAILED DESCRIPTION

Figure 1:
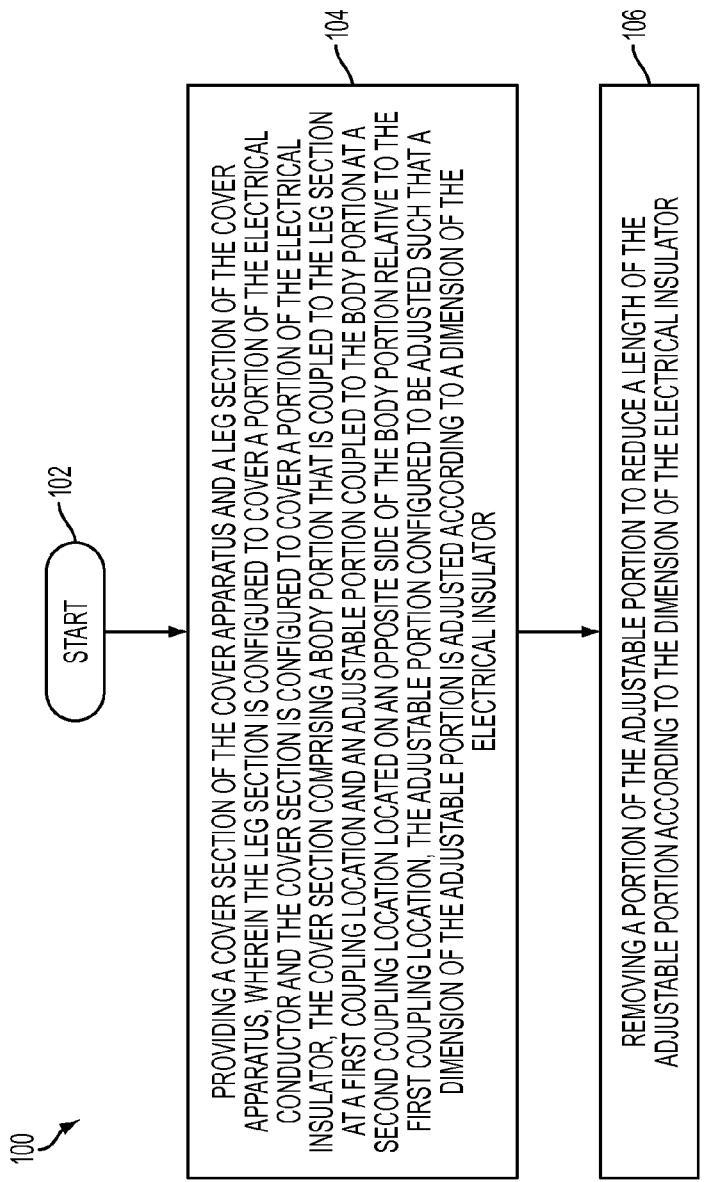
FIG. 1 is a flow diagram illustrating an example method of forming a cover apparatus for covering an electrical insulator and electrical conductor.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter.

Turning to FIG. 1, an example method 100 of forming a cover apparatus is illustrated. The method 100 can be used in association with some or all of the features illustrated in FIGS. 2 to 7. At 102, the method 100 starts. At 104, a cover section of the cover apparatus and a leg section of the cover apparatus can be provided. The leg section can cover a portion of an electrical insulator. The cover section can include a body portion that is coupled to the leg section at a first coupling location and an adjustable portion coupled to the body portion at a second coupling location located on an opposite side of the body portion relative to the first coupling location. The adjustable portion can be adjusted such that a dimension of the adjustable portion is adjusted according to a dimension of the electrical insulator. At 106, a portion of the adjustable portion can be removed to reduce a length of the adjustable portion according to the dimension of the electrical insulator.

Figure 2:
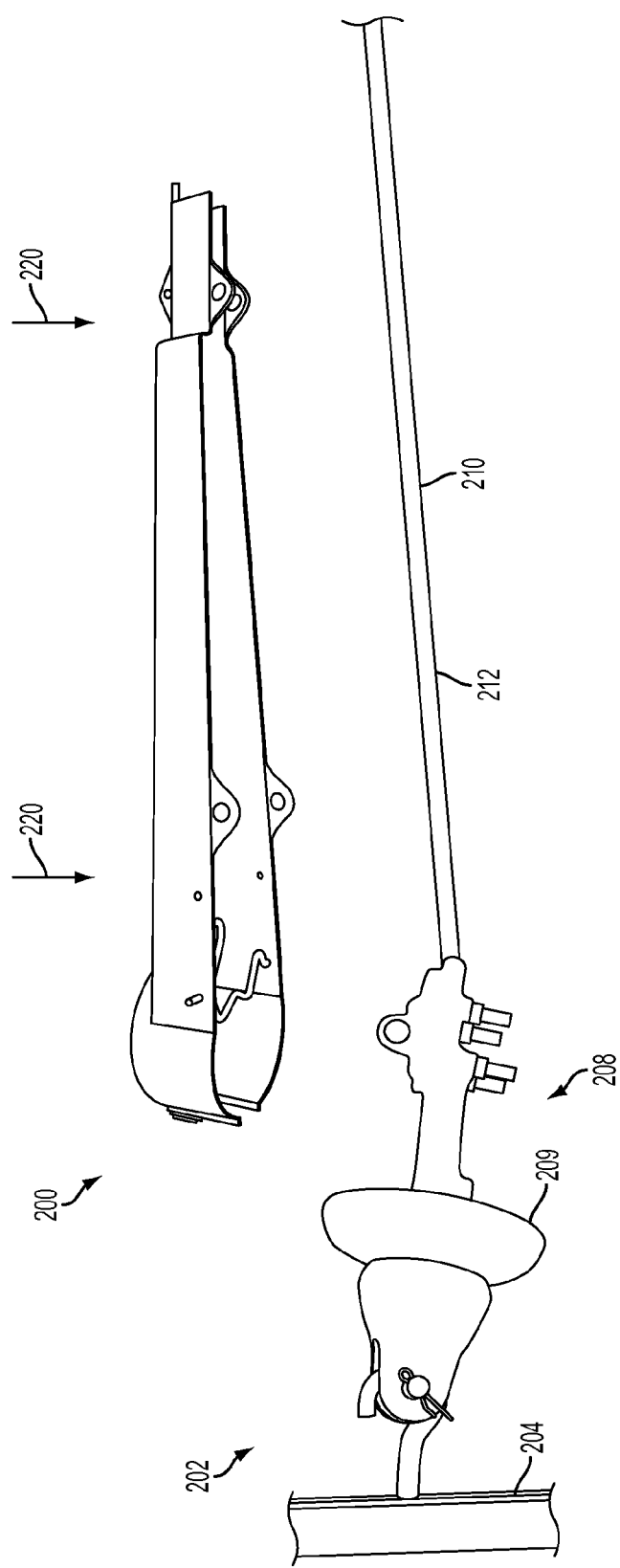
FIG. 2 is an illustration of an example cover apparatus in a removed/detached state from an electrical structure.

Turning now to FIG. 2, a cover apparatus 200 is illustrated for covering an electrical structure 202, including an electrical insulator 208 and an electrical conductor 210. The cover apparatus 200 is illustrated in a partially detached state from the electrical structure 202 so as to more clearly illustrate the features of the cover apparatus 200 and the electrical structure 202. In general, the cover apparatus 200 can cover the electrical structure 202 to provide at least some degree of protection to birds, raptors, eagles and/or other wildlife. For example, the cover apparatus 200 can comprise a non-conductive material, such as plastics, composites, etc.

The electrical structure 202 is somewhat generically/schematically illustrated, as the electrical structure 202 includes any number of sizes, shapes, structures, and configurations. In an example, the electrical structure 202 includes a utility pole 204. The utility pole 204 can support power lines, cables, fiber optic cables, transformers, street lights, or any other type of equipment. The utility pole 204 can include materials such as wood, metal, concrete, composites (e.g., fiberglass, etc.) or the like.

The utility pole 204 can support the electrical insulator 208. The electrical insulator 208 can withstand operating voltage and electrical surges. The electrical insulator 208 can include any number of materials. In an example, the electrical insulator 208 includes porcelain, though other materials are envisioned, including ceramic, glass, polymers, or the like. While the utility pole 204 is illustrated to support one electrical insulator 208 in this example, the utility pole 204 could likewise support multiple electrical insulators 208 in other examples.

The electrical insulator 208 can extend along a substantially horizontal axis with respect to a surface of a material(s) into which the utility pole 204 is inserted, mounted, etc. (e.g., pavement, concrete, earth, etc.). The electrical insulator 208 can include one or more sheds 209 that project radially outwardly from a center of the electrical insulator 208. Any number of sheds 209 can be provided (e.g., more than or less than single shed illustrated in FIG. 2). Likewise, the sheds 209 can include any number of dimensions, such as by being larger or smaller than as illustrated, being closer together, etc.

The electrical insulator 208 can support at least one electrical conductor 210. The electrical conductor 210 can allow for current to flow through the electrical conductor 210 so as to supply electricity. The electrical conductor 210 can include wires, cables, electrical lines, or nearly any type of structure capable of allowing for current to flow therethrough. The electrical conductor 210 is not limited to the illustrated dimensions, and could have a larger or smaller cross-sectional thickness than as illustrated. Likewise, the electrical conductor 210 can extend a longer distance than as illustrated, as only a portion of the electrical conductor 210 is illustrated.

In an example, the electrical conductor 210 includes one or more portions. For example, the electrical conductor 210 includes a first portion 212 disposed on one side of the electrical insulator 208. In other examples, however, the electrical conductor 210 is not limited to the first portion 212, and may also include a second portion (not shown). The first portion 212 can extend a longer or shorter distance than as illustrated. Further, the first portion 212 and second portion can extend generally coaxially with each other along a linear axis. In other examples, however, the first portion 212 and second portion can extend along axes that are non-coaxial with each other.

As illustrated by the directional arrows 220, the cover apparatus 200 can be applied to the electrical structure 202 so as to cover the electrical insulator 208 and the electrical conductor 210. In an example, the directional arrows 220 are illustrated as being oriented in a downward direction, such as substantially perpendicular to a surface of a material(s) into which the utility pole 204 is inserted, mounted, etc. (e.g., pavement, concrete, earth, etc.). In an example, however, the cover apparatus 200 is not limited to being moved along the directional arrows 220 in the downward direction. Rather, the cover apparatus 200 can be applied to the electrical structure 202 from an angle relative to the surface of the material.

Figure 3:
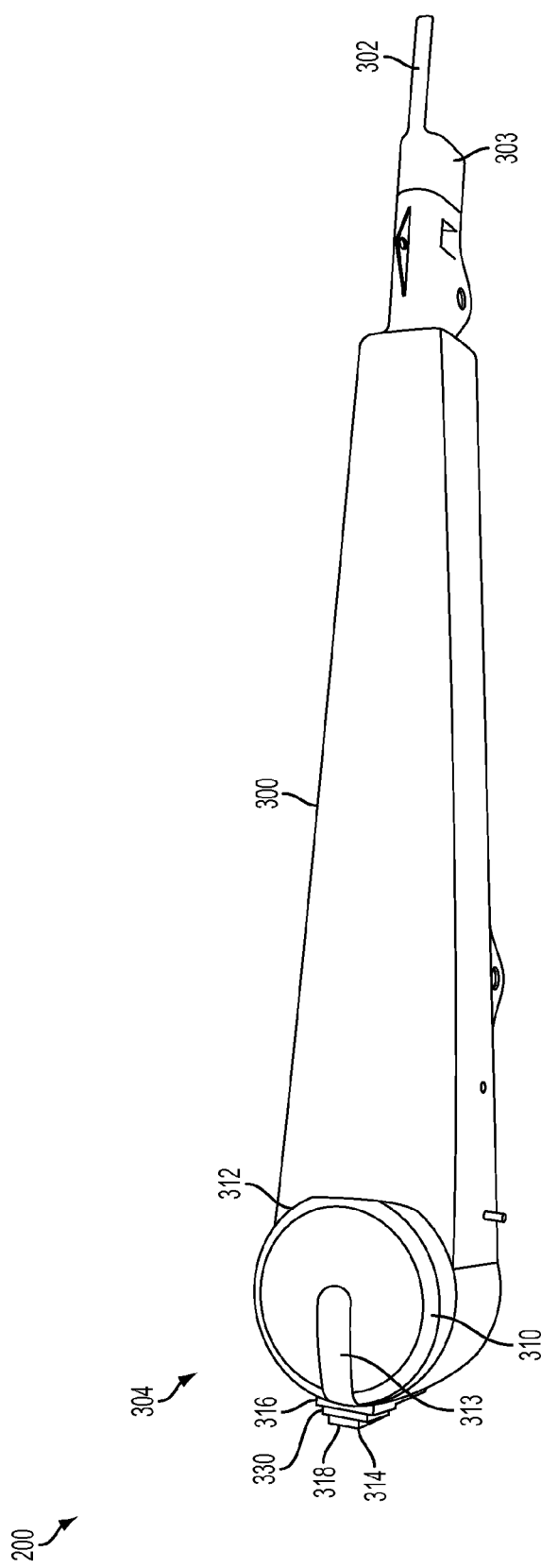
FIG. 3 is an illustration of an example cover apparatus.

Turning now to FIG. 3, the cover apparatus 200 is illustrated in more detail. While the cover apparatus 200 is illustrated without the electrical structure 202 for ease of illustration, in operation, the cover apparatus 200 can be provided in association with the electrical structure 202 similar to the example illustrated in FIG. 2. The cover apparatus 200 can be longer or shorter in length than as illustrated. In an example, the cover apparatus 200 can include a length of approximately 112 centimeters (e.g., ~44 inches). In other examples, however, the cover apparatus 200 could be longer or shorter, and is not limited to the dimensions disclosed herein.

The cover apparatus 200 includes one or more leg sections 300. In the illustrated examples, the one or more leg sections 300 include a single leg section 300. In other examples, however, the one or more leg sections 300 may include a plurality of leg sections. The leg section 300 can cover at least a portion (e.g., first portion 212) of the electrical conductor 210. The leg section 300 can be generally hollow so as to support/receive structures therein. In an example, the leg section 300 can receive the first portion 212 of the electrical conductor 210 therein. It is to be appreciated that the leg section 300 can extend a longer or shorter distance than as illustrated herein, such that the leg section 300 can cover a longer or shorter portion of the first portion 212.

The leg section 300 includes a support portion 302. The support portion 302 can be disposed at a distal end 303 of the leg section 300. The support portion 302 can extend substantially parallel to and in proximity with the electrical conductor 210. In the illustrated example, the support portion 302 extends along a generally linear axis that is coaxial with an axis along which the leg section 300 extends. In other examples, however, the support portion 302 may not extend linearly, and instead could include bends, curves, helical rotations, or the like. Further, the support portion 302 includes any number of dimensions, such as by extending a longer or shorter distance than as shown and/or having a larger or smaller cross-sectional size. As will be described in more detail below, a fixing item can engage the support portion 302 and the electrical conductor 210 so as to attach the leg section 300 to the electrical conductor 210.

The cover apparatus 200 can include a cover section 304. The cover section 304 can be coupled to the leg section 300 and cover a portion of the electrical insulator 208 and/or a portion of the electrical conductor 210. For example, the cover section 304 can be coupled to the leg section 300. In an example, the cover section 304 can be integrally formed with the leg section 300, such that the cover section 304 and the leg section 300 are generally a composite structure. In an example, the cover section 304 and the leg section 300 can be separately attached to each other, such as by adhesives, mechanical fasteners, molding, etc.

The cover section 304 can include a body portion 310 coupled to the leg section 300 at a first coupling location 312. In an example, the body portion 310 is a rounded, generally circularly shaped structure with a hollow center portion. The body portion 310 is sized and shaped so as to receive at least a portion of the electrical insulator 208 and/or the electrical conductor 210 therein. In an example, the body portion 310 can be large enough so as to receive at least a portion of the electrical insulator 208 therein, such that the body portion 310 may be larger or slightly larger in size than the electrical insulator 208. The body portion 310 is not limited to the generally circular shape that is illustrated. Rather, the body portion 310 can instead include quadrilateral shapes (e.g., square, rectangular, etc.), oval shapes, or the like. Likewise, the body portion 310 can be larger or smaller in size than as illustrated, depending, at least in part, on the size(s) of the electrical insulator 208 and/or the electrical conductor 210. The body portion 310 can include a first opening 313 that can accommodate a second portion of the electrical conductor 210. In an example, the second portion of the electrical conductor 210 can extend through the first opening 313.

The cover section 304 can include an adjustable portion 314. The adjustable portion 314 can be coupled to the body portion 310 at a second coupling location 316. The adjustable portion 314 can extend outwardly from the body portion 310 in a direction away from the second coupling location 316. The second coupling location 316 can be located on an opposite side of the body portion 310 relative to the first coupling location 312. The body portion 310 can therefore extend between the first coupling location 312 at one end and the second coupling location 316 at an opposing second end. The adjustable portion 314 can be integrally formed with the body portion 310, such that the adjustable portion 314 and the body portion 310 are generally a composite structure. In an example, the adjustable portion 314 and the body portion 310 can be separately attached to each other, such as by adhesives, mechanical fasteners, molding, etc. It will be appreciated that the first coupling location and/or the second coupling location and/or any other coupling, connecting, etc. locations, features, etc. mentioned in this application are not meant to exclude a composite structure and/or do not necessarily imply multiple separate pieces, elements, etc. that are joined, fastened, etc. together. For example, the body portion 310 and the leg section 300 may be comprised within a composite structure, such that the first coupling location 312 merely corresponds to a demarcation on the composite structure.

The adjustable portion 314 can define a second opening 317 (e.g., illustrated in FIG. 4) that accommodates a second portion of the electrical insulator 208. In an example, the first opening 313 can extend towards the second opening 317. The second opening 317 can accommodate (e.g., receive through) a portion of the electrical insulator 208, such as, in an example, a second portion of the electrical insulator 208.

The adjustable portion 314 can be adjusted such that a dimension of the adjustable portion can be adjusted according to a dimension of the electrical insulator 208. In an example, the dimension of the adjustable portion 314 corresponds to a length of the adjustable portion 314 as measured from the second coupling location 316 to a distal end 318 of the adjustable portion 314. The adjustable portion 314 can include one or more separable sections 330. As illustrated, the separable sections 330 include a plurality of separable sections, though the adjustable portion 314 is not so limited. For example, the adjustable portion 314 can include greater than or less than the number of separable sections 330 illustrated in FIG. 3. In an example, the length of the adjustable portion 314 can be substantially parallel to an axis along which the electrical conductor 210 extends.

The separable sections 330 can be spaced apart along the length of the adjustable portion 314. In an example, the separable sections 330 can project outwardly from the body portion 310. The separable sections 330 can define stepped or raised portions, with gradually decreasing cross-sectional sizes in a direction away from the body portion 310. In other examples, however, the separable sections 330 are not limited to the illustrated structure. Rather, the separable sections 330 could include separating marks (weakened portions, perforations, etc.). In another example, the separable sections 330 need not define stepped/raised portions, and instead could have a generally constant cross-sectional size.

Upon removal of the separable section(s) 330, the length of the adjustable portion 314 can be reduced. For example, the separable sections 330 can comprise a first separable section 330a separated from a second separable section 330b (e.g., illustrated in FIG. 5). In operation, a user can reduce the length of the adjustable portion 314 by removing the first separable section 330a. The user can remove the first separable section 330a, such as by making a cut, a break, or the like at a location between the first separable section 330a and the second separable section 330b. The user can similarly reduce the length of the adjustable portion 314 to a greater degree by removing more than one separable section 330.

Figure 4:
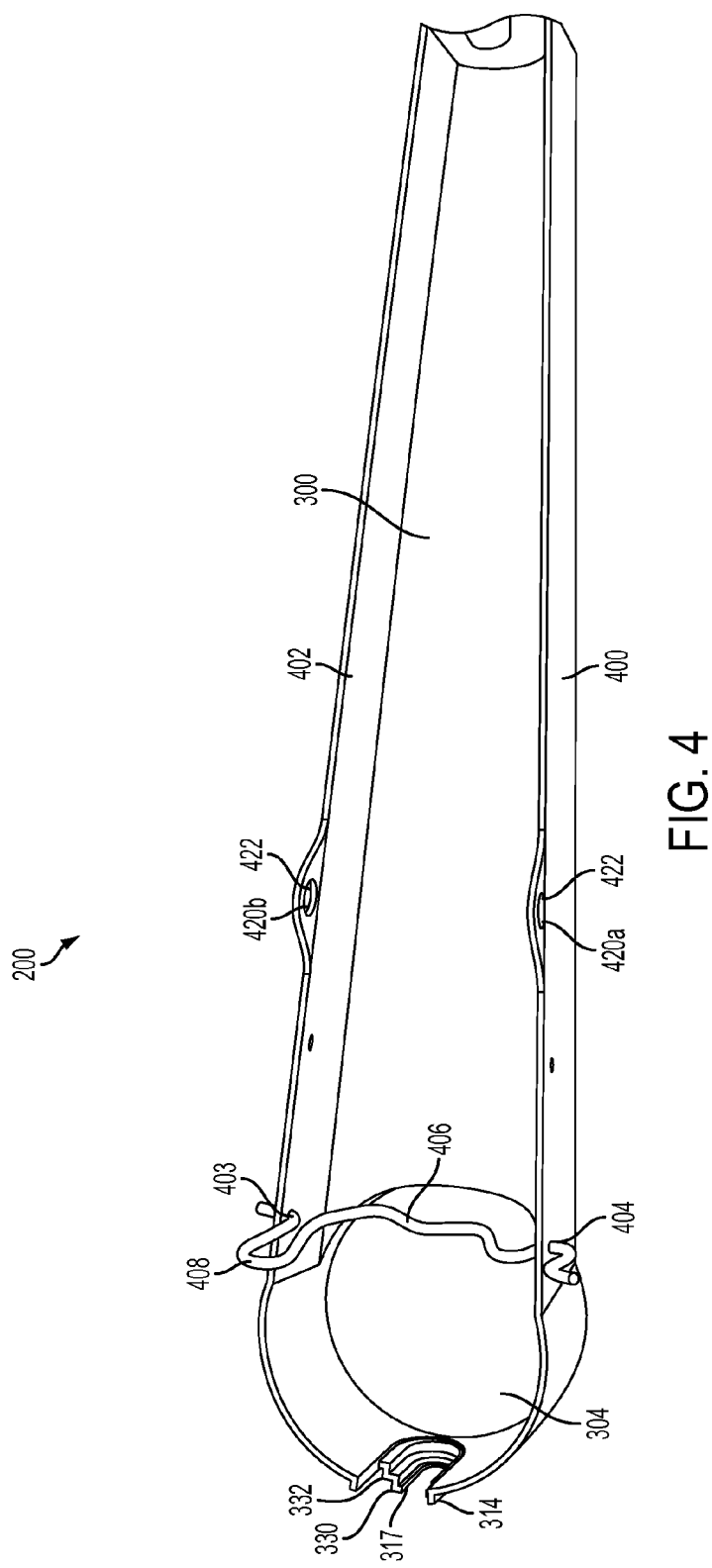
FIG. 4 is an illustration of an underside of an example cover apparatus.

Turning now to FIG. 4, an underside view of the cover apparatus 200 is illustrated. The cover apparatus 200 includes a first wall 400 and a second wall 402. The first wall 400 and second wall 402 can extend along and at least partially form the leg section 300 and the cover section 304. The first wall 400 and second wall 402 extend generally parallel to each other and are spaced apart to define a hollow interior that is sized/shaped to receive the electrical insulator 208 and/or the electrical conductor 210.

The cover apparatus 200 can include one or more attachment openings. In an example, the attachment openings can include a first attachment opening 403 in the first wall 400 and a second attachment opening 404 in the second wall 402. The first attachment opening 403 and second attachment opening 404 can be formed in either or both of the leg section 300 or cover section 304. The first attachment opening 403 and second attachment opening 404 can, together, secure the cover apparatus 200 to the electrical conductor 210. In the illustrated example, the cover apparatus 200 can include a total of two attachment openings, though in other examples, any number of attachment openings can be provided.

The first attachment opening 403 and second attachment opening 404 can receive an attaching item 406. The attaching item 406 can assist in securing and maintaining the electrical conductor 210 within the cover apparatus 200. In an example, the attaching item 406 can be placed into the first attachment opening 403 and the second attachment opening 404 to couple the first wall 400 to the second wall 402. As such, the first wall 400 and the second wall 402 are configured such that the leg section 300 is maintained in a covering arrangement relative to the portion of the electrical conductor 210 when the attaching item 406 is received within the first attachment opening 403 and the second attachment opening 404.

In an example, the attaching item 406 can extend along a generally non-linear axis. In an example, the attaching item 406 can include one or more bends, curves, undulations, or the like. The attaching item 406 can include, for example, at least one concave receiving portion 408. The concave receiving portion 408 defines a gripping area, holding area, or the like, onto which a gripping structure can grip the attaching item 406. In an example, an insulated pole (e.g., "hot stick") can grip the receiving portion 408 of the attaching item 406 to facilitate insertion of the attaching item 406 into the first attachment opening 403 and the second attachment opening 404. In other examples, the attaching item 406 is not limited to including the illustrated shape. Rather, the attaching item 406 in other examples could extend along a generally linear axis.

The cover apparatus 200 can include one or more gripping structures 420 located in the leg section 300. The gripping structures 420 can be supported by the first wall 400 and second wall 402. In an example, a first gripping structure 420a can be supported by the first wall 400 while a second gripping structure 420b can be supported by the second wall 402. As illustrated, the gripping structures 420 can be positioned on opposing walls. Along these lines, a third gripping structure 420c (e.g., illustrated in FIG. 7) can be supported by the second wall 402 while a fourth gripping structure 420d (e.g., illustrated in FIG. 7) can be supported by the first wall 400. The cover apparatus 200 is not specifically limited to the gripping structures 420 being located on alternating walls. Rather, in an example, the gripping structures 420 could instead be positioned on walls on the same side (e.g., the first wall 400 or the second wall 402).

At least some of the gripping structures 420 include a gripping opening 422. The gripping opening 422 can allow for a structure, such as an insulated pole (e.g., "hot stick") or the like, to grip the gripping structures 420 through the gripping opening 422. In the illustrated example, due to the gripping structures 420 being located on opposing walls, the insulated pole can more easily provide a downward, pulling force to the cover apparatus 200 on both sides of the electrical insulator 208 and electrical conductor 210. As such, the first gripping structure 420a and the second gripping structure 420b can facilitate installation of the cover apparatus 200 onto the electrical conductor 210.

Figure 5:
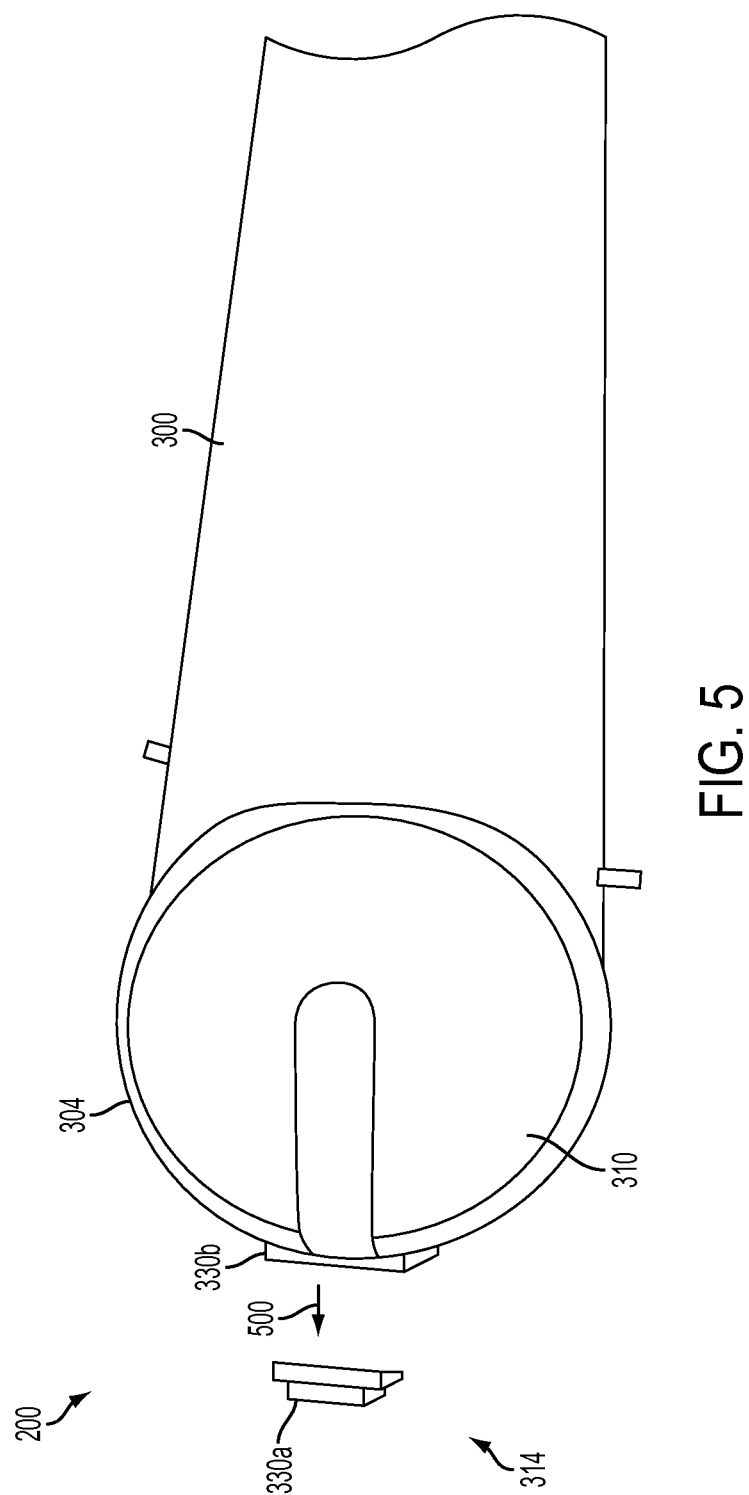
FIG. 5 is an illustration of an example cover apparatus having a separable section of an adjustable portion removed.

Turning now to FIG. 5, an example of a method of forming the cover apparatus 200 is illustrated. In this example, the adjustable portion 314 of the cover apparatus 200 can be adjusted such that a dimension of the adjustable portion 314 is adjusted according to a dimension of the electrical insulator 208. In an example, the first separable section 330a can be removed (e.g., illustrated generically/schematically with arrowhead 500) from the adjustable portion 314. The first separable section 330a can be separated from the adjustable portion 314 in any number of ways, such as by cutting, breaking, etc. along the separating mark 332. As such, the dimension, for example, the length, of the adjustable portion 314 can be adjusted and reduced as measured from the second coupling location 316 to the distal end 318 of the adjustable portion 314.

Figure 6:
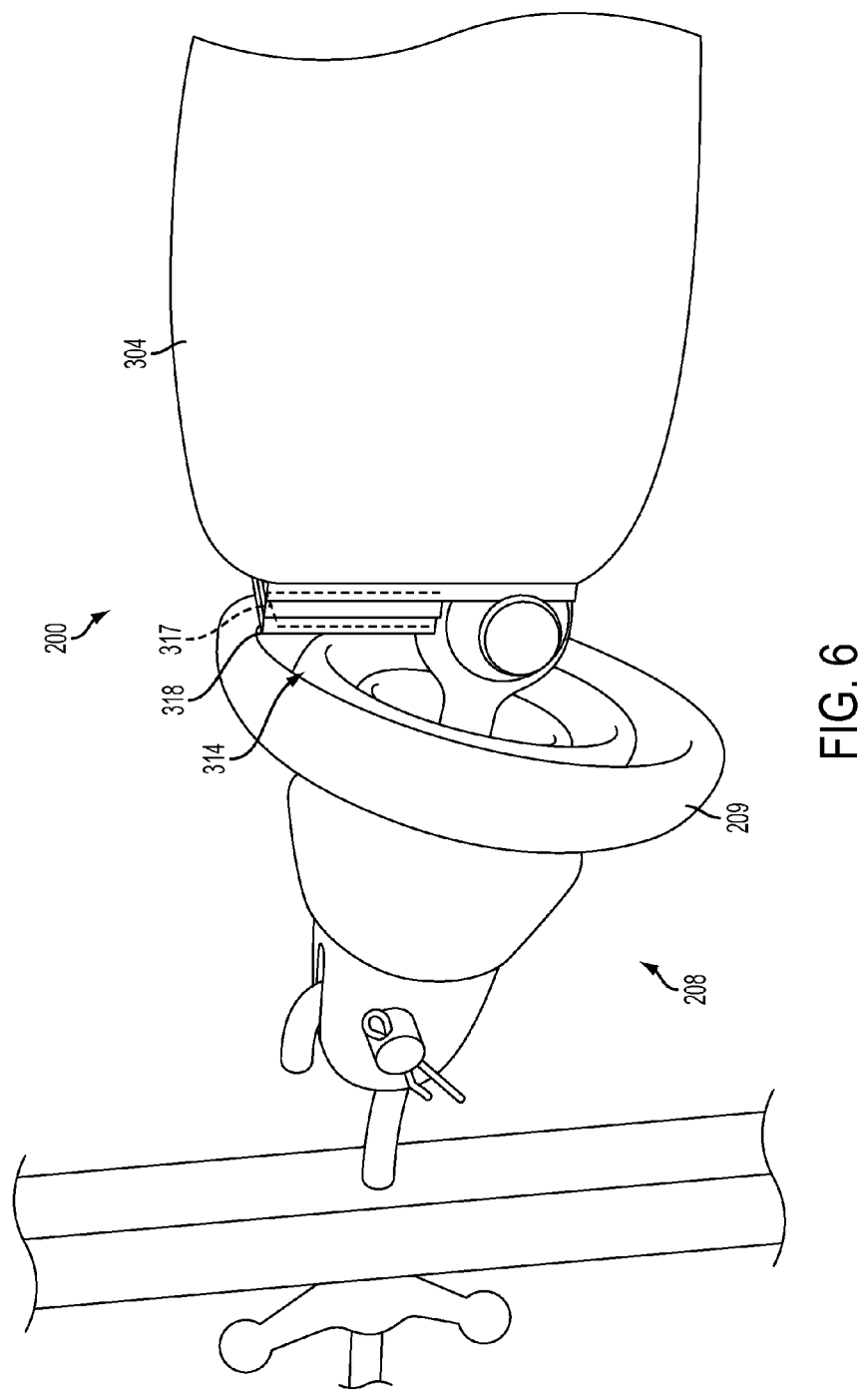
FIG. 6 is an illustration of an example cover apparatus attached to an electrical structure.

Turning now to FIG. 6, the cover apparatus 200 can be fully attached to the electrical structure 202. In this example, a portion of the cover apparatus 200 in association with the electrical insulator 208 and electrical conductor 210 is illustrated. In operation, however, the cover apparatus 200 can be larger than as illustrated in FIG. 6, such as by having dimensions similar to the example illustrated in FIG. 2.

The cover apparatus 200 can be fully attached to the electrical structure 202 such that the cover section 304 extends around the portion of the electrical insulator 208. The adjustable portion 314 can be dimensionally adjusted (e.g., before and/or after being attached to the electrical structure) to include any number of lengths. In an example, the adjustable portion 314 can be dimensionally adjusted such that the distal end 318 of the adjustable portion 314 is in proximity to the shed 209 of the electrical insulator 208. For example, the distal end 318 can be in proximity to the shed 209 without blocking and/or covering the shed 209. In other examples, however, the adjustable portion 314 can extend a longer or shorter distance than as illustrated. In the illustrated example, the cover section 304 can extend along a substantially horizontal axis.

Figure 7:
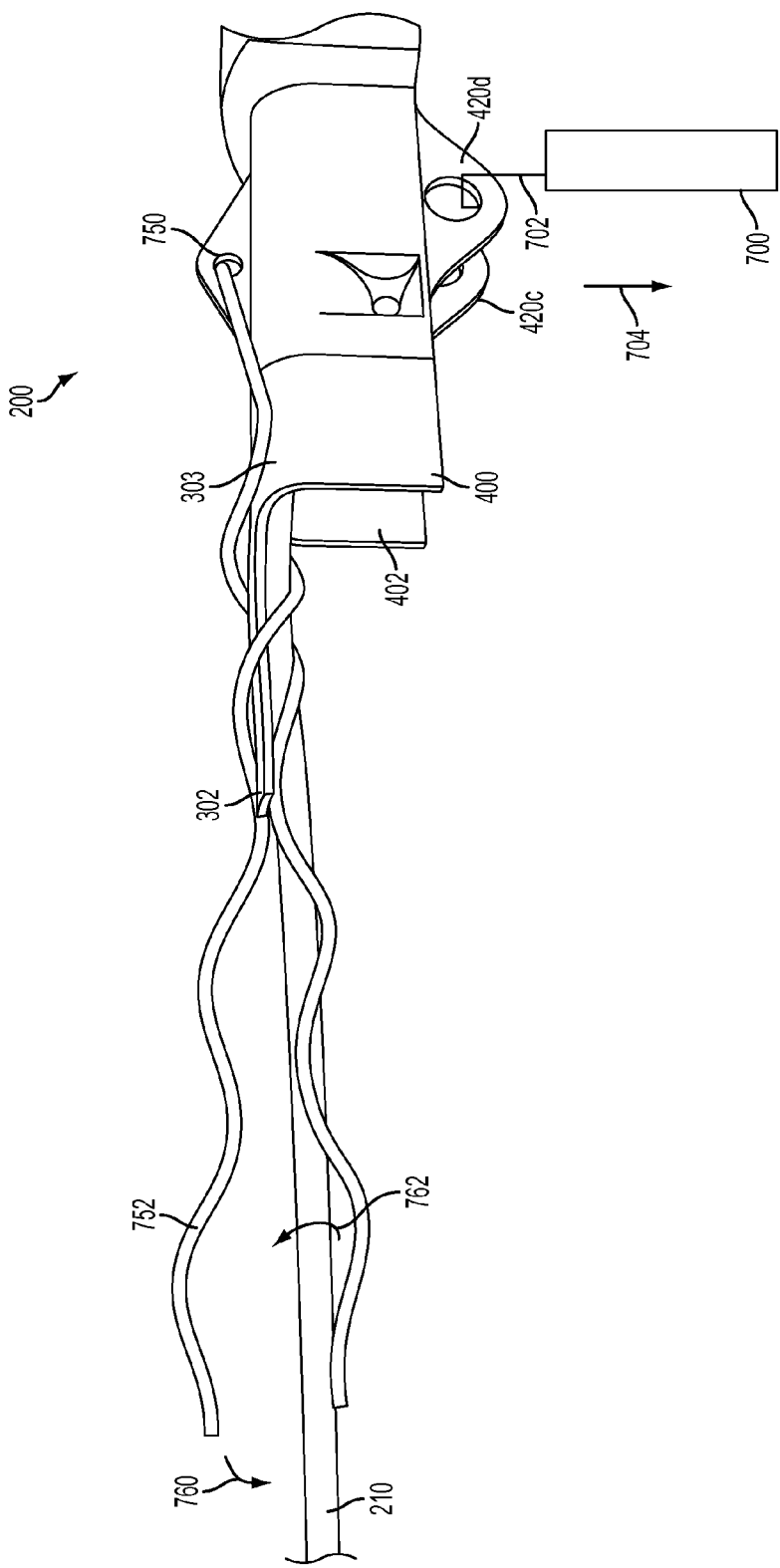
FIG. 7 is an illustration of a distal end of an example cover apparatus attached to an electrical structure.

Turning now to FIG. 7, the distal end 303 of the leg section 300 of the cover apparatus 200 is illustrated. In an example, an insulated pole 700 (e.g., "hot stick") can be used to attach the cover apparatus 200 to the electrical structure 202. The insulated pole 700 is somewhat generically/schematically depicted, as the insulated pole 700 includes any number of sizes/shapes/constructions (e.g., longer or shorter in length, etc.). The insulated pole 700 can be handled and operated by a user.

The insulated pole 700 includes a hooked portion 702. The hooked portion 702 is disposed at an end of the insulated pole 700. The hooked portion 702 is sized to be received within the gripping openings 722 of the gripping structure 420. In this example, the hooked portion 702 of the insulated pole 700 is illustrated as engaging the first gripping structure 420a, though the insulated pole 700 can similarly engage the second gripping structure 420b, third gripping structure 420c, and/or fourth gripping structure 420d, etc. In this example, the user can exert a pulling force 704 on the cover apparatus 200. The pulling force 704 can, in an example, be directed downwards. The pulling force 704 is sufficient to pull the cover apparatus 200 onto the electrical structure 202 (e.g., electrical conductor 210, electrical insulator 208, etc.).

The cover apparatus 200 can include a fixing opening 750 disposed at the distal end 303 of the leg section 300. In an example, the fixing opening 750 is positioned at the distal end 303 in proximity to the support portion 302. In other examples, however, the fixing opening 750 can be positioned closer to the support portion 302 or further from the support portion 302 than as shown. The fixing opening 750 comprises an opening, aperture, or the like. In the illustrated example, the fixing opening 750 is positioned along an upper wall/surface of the leg section 300. In other examples, however, the fixing opening 750 could similarly be positioned along side walls (e.g., first wall 400 and/or second wall 402), or the like.

The fixing opening can receive a fixing item 752. The fixing item 752 can engage the support portion 302 and the electrical conductor 210 such that the leg section 300 is maintained in a covering arrangement relative to the portion of the electrical conductor 210. The fixing item 752 can include, for example, a wire, cable, rope, harness, or any other type of structure/device that can provide a fixing functionality. In the illustrated example, the fixing item 752 can include an elongated, semi-flexible wire. The fixing item 752 can be wrapped around the support portion 302 and the electrical conductor 210. In the illustrated example, ends of the fixing item 752 can be moved in a first wrapping direction 760 (e.g., illustrated generically/schematically with arrowhead) and a second wrapping direction 762 (e.g., illustrated generically/schematically with arrowhead). In operation, the fixing item 752 can wind partially or completely around the support portion 302 and the electrical conductor 210. This engagement can maintain the leg section 300 in a covering arrangement relative to the electrical conductor 210. Additionally, this engagement can limit twisting, rotating, and/or any inadvertent turning of the cover apparatus 200 with respect to the electrical conductor 210.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first cover portion and a second cover portion generally correspond to cover portion A and cover portion B or two different or two identical cover portions or the same cover portions.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A cover apparatus for covering an electrical insulator and an electrical conductor, the cover apparatus comprising:
    a leg section configured to cover a portion of the electrical conductor; and
    a cover section configured to cover a portion of the electrical insulator, the cover section comprising:
        a body portion that is coupled to the leg section at a first coupling location; and
        an adjustable portion coupled to the body portion at a second coupling location located on an opposite side of the body portion relative to the first coupling location, the adjustable portion comprising a plurality of separable sections configured to be removed to adjust a dimension of the adjustable portion according to a dimension of the electrical insulator.

2. The cover apparatus of claim 1, wherein the leg section comprises a support portion disposed at a distal end of the leg section opposite the first coupling location.

3. The cover apparatus of claim 2, wherein the leg section comprises a first attachment opening in a first wall and a second attachment opening in an opposing second wall.

4. The cover apparatus of claim 3, wherein the first wall and the second wall are configured such that the leg section is maintained in a covering arrangement relative to the portion of the electrical conductor when an attaching item is received within the first attachment opening and second attachment opening.

5. The cover apparatus of claim 4, wherein the attaching item comprises at least one concave receiving portion configured to be gripped by a gripping structure.

6. The cover apparatus of claim 1, wherein the body portion defines a first opening configured to accommodate a second portion of the electrical conductor.

7. The cover apparatus of claim 6, wherein the first opening is disposed between the first coupling location and the second coupling location.

8. The cover apparatus of claim 7, wherein the adjustable portion defines a second opening configured to accommodate a second portion of the electrical insulator.

9. The cover apparatus of claim 8, wherein the first opening extends towards the second opening.

10. A cover apparatus for covering an electrical insulator and an electrical conductor, the cover apparatus comprising:
    a leg section configured to cover a portion of the electrical conductor; and
    a cover section configured to cover a portion of the electrical insulator, the cover section comprising:
        a body portion that is coupled to the leg section at a first coupling location, the body portion defining a first opening configured to accommodate a second portion of the electrical conductor; and
        an adjustable portion coupled to the body portion at a second coupling location located on an opposite side of the body portion relative to the first coupling location, the adjustable portion comprising a plurality of separable sections configured to be removed to adjust a dimension of the adjustable portion according to a dimension of the electrical insulator, the adjustable portion defining a second opening configured to accommodate a second portion of the electrical insulator.

11. The cover apparatus of claim 10, wherein the leg section comprises a support portion disposed at a distal end of the leg section opposite the first coupling location.

12. The cover apparatus of claim 11, wherein the support portion extends substantially parallel to and in proximity with the electrical conductor.

13. The cover apparatus of claim 11, wherein the leg section comprises a fixing opening disposed at the distal end of the leg section.

14. The cover apparatus of claim 13, wherein the fixing opening is configured to receive a fixing item, the fixing item configured to engage the support portion and the electrical conductor such that the leg section is maintained in a covering arrangement relative to the portion of the electrical conductor.

15. The cover apparatus of claim 14, wherein the fixing item is configured to wrap around the support portion and the electrical conductor.

16. The cover apparatus of claim 10, wherein the adjustable portion extends outwardly from the body portion in a direction away from the second coupling location.

17. The cover apparatus of claim 10, wherein the plurality of separable sections are spaced apart along a length of the adjustable portion as measured from the second coupling location to a distal end of the adjustable portion.

18. The cover apparatus of claim 17, wherein the length of the adjustable portion is reduced upon removal of a separable section of the plurality of separable sections.

19. A method of forming a cover apparatus for covering an electrical insulator and an electrical conductor, comprising:
    providing a cover section of the cover apparatus and a leg section of the cover apparatus, wherein the leg section is configured to cover a portion of the electrical conductor and the cover section is configured to cover a portion of the electrical insulator, the cover section comprising a body portion that is coupled to the leg section at a first coupling location and an adjustable portion coupled to the body portion at a second coupling location located on an opposite side of the body portion relative to the first coupling location, the adjustable portion comprising a plurality of separable sections configured to be removed to adjust a length of the adjustable portion according to a dimension of the electrical insulator; and
    removing a separable section of the plurality of separable sections to reduce the length of the adjustable portion according to the dimension of the electrical insulator.

20. The method of claim 19, wherein the removing comprises reducing the length of the adjustable portion in a direction that is substantially parallel to an axis along which the electrical conductor extends.

* * * * *